United States Patent
Pietrobon (12)

(10) Patent No.: US 12,453,491 B2
(45) Date of Patent: Oct. 28, 2025

(54) PROBE INSERTION METHODS AND APPARATUS

(71) Applicant: INTERACOUSTICS A/S, Middelfart (DK)

(72) Inventor: Jonathan Mark Pietrobon, London (CA)

(73) Assignee: Interacoustics A/S, Middelfart (DK)

( * ) Notice: Subject to any disclaimer, the term of this patent is extended or adjusted under 35 U.S.C. 154(b) by 973 days.

(21) Appl. No.: 16/507,449

(22) Filed: Jul. 10, 2019

(65) Prior Publication Data

US 2020/0297252 A1 Sep. 24, 2020

Related U.S. Application Data

(60) Provisional application No. 62/822,307, filed on Mar. 22, 2019.

(51) Int. Cl.
| | |
|---|---|
| *A61B 5/12* | (2006.01) |
| *A61B 5/00* | (2006.01) |
| *A61B 5/107* | (2006.01) |
| *H04R 25/00* | (2006.01) |
| *H04R 29/00* | (2006.01) |

(52) U.S. Cl.
CPC ............ *A61B 5/126* (2013.01); *A61B 5/1076* (2013.01); *A61B 5/6817* (2013.01); *H04R 25/70* (2013.01); *H04R 29/004* (2013.01)

(58) Field of Classification Search
CPC ..... A61B 5/126; A61B 5/1076; A61B 5/6817; H04R 29/004
See application file for complete search history.

(56) References Cited

U.S. PATENT DOCUMENTS

| | | | |
|---|---|---|---|
| 2004/0037428 A1* | 2/2004 | Keller | A61B 5/121 381/60 |
| 2008/0004904 A1* | 1/2008 | Tran | A61B 5/411 340/286.07 |

(Continued)

FOREIGN PATENT DOCUMENTS

WO WO-9723117 A1 * 6/1997 ............. A61B 5/121

*Primary Examiner* — Alex M Valvis
*Assistant Examiner* — Anna Roberts
(74) *Attorney, Agent, or Firm* — Birch, Stewart, Kolasch & Birch, LLP

(57) ABSTRACT

A probe insertion apparatus for real ear measurement includes a probe tube, a reference microphone, a reference speaker, an operator feedback device, a memory, and a processor. The processor is configured to direct the reference speaker to continuously emit reference sound, continuously receive reference signals from the reference microphone and tympanic reflection signals from the measurement microphone, and continuously make determinations of a tympanic distance between the sound receiving end of the probe tube and a tympanic membrane based on the reference and tympanic reflection signals and absent reference to a calibration measurement, as the operator moves the sound receiving end towards the tympanic membrane. The processor is also configured to automatically direct the operator feedback device to provide indicia of the tympanic distance between the sound receiving end of the probe tube and a tympanic membrane, as the operator moves the sound receiving end towards the tympanic membrane.

19 Claims, 10 Drawing Sheets

(56) References Cited

U.S. PATENT DOCUMENTS

2015/0305678 A1* 10/2015 Reinholdt-Nielsen ........................ A61B 5/126 600/559
2016/0330535 A1* 11/2016 Chiang .................. H04R 1/083
2019/0046089 A1* 2/2019 Pislak .................. A61B 5/1076

* cited by examiner

PROBE INSERTION METHODS AND APPARATUS

FIELD

This application relates to the field of probe insertion methods and apparatus for real ear measurement.

INTRODUCTION

"Real ear measurement" is the process of measuring sound pressure levels in a patient's ear canal. This is often done for the purpose of hearing aid verification. The process traditionally involves inserting a probe microphone into the ear canal to record amplified signals.

SUMMARY

In one aspect, a probe insertion apparatus for real ear measurement is provided. The apparatus may include a probe tube, a reference microphone, a reference speaker, an operator feedback device, a memory storing computer readable instructions, and a processor. The probe tube may have a sound receiving end positionable in an ear canal, and a sound output end sonically coupled to a measurement microphone. The reference microphone may be positionable outside the ear canal. The reference speaker may be positionable to emit reference sound towards the ear canal. The memory may store computer readable instructions. The processor may be configured to execute the computer readable instructions, wherein the computer readable instructions when executed may configure the processor to:
  direct the reference speaker to continuously emit the reference sound,
  continuously receive reference signals from the reference microphone, and tympanic reflection signals from the measurement microphone,
  continuously make determinations of a tympanic distance between the sound receiving end of the probe tube and a tympanic membrane based on the reference signals and the tympanic reflection signals and absent reference to a calibration measurement, as the operator moves the sound receiving end towards the tympanic membrane, and
  automatically direct the operator feedback device to provide indicia of the tympanic distance between the sound receiving end of the probe tube and a tympanic membrane, as the operator moves the sound receiving end towards the tympanic membrane.

In another aspect, a probe insertion apparatus for real ear measurement is provided. The apparatus may include a measurement microphone input, a reference microphone input, a reference speaker output, an operator feedback device output, a memory storing computer readable instructions, and a processor configured to execute the computer readable instructions. The computer readable instructions when executed may configure the processor to:
  send directions to the reference speaker output to continuously emit a reference sound,
  continuously receive reference signals from the reference microphone input, and tympanic reflection signals from the measurement microphone input,
  continuously make determinations of a tympanic probe distance based on the reference signals and the tympanic reflection signals and absent reference to a calibration measurement, and
  automatically send directions to the operator feedback device output to provide indicia of the tympanic probe distance between the sound receiving end of the probe tube and a tympanic membrane.

In another aspect, a method of performing a real ear measurement is provided. The method may include:
  a) emitting reference sound towards the ear canal,
  b) moving a sound receiving end of a probe tube in an ear canal towards a tympanic membrane,
  c) receiving tympanic reflection signals from a measurement microphone acoustically coupled to the probe tube,
  d) receiving reference signals from a reference microphone located outside the ear canal,
  e) continuously determining a tympanic distance between the sound receiving end of the probe tube and the tympanic membrane based on the reflection signals and the reference signals and absent reference to a calibration measurement, and
  f) continuously providing indicia of the determined tympanic distance between the sound receiving end of the probe tube and the tympanic membrane,
  wherein a) to f) are performed concurrently.

DRAWINGS

DESCRIPTION OF VARIOUS EMBODIMENTS

Figure 1:
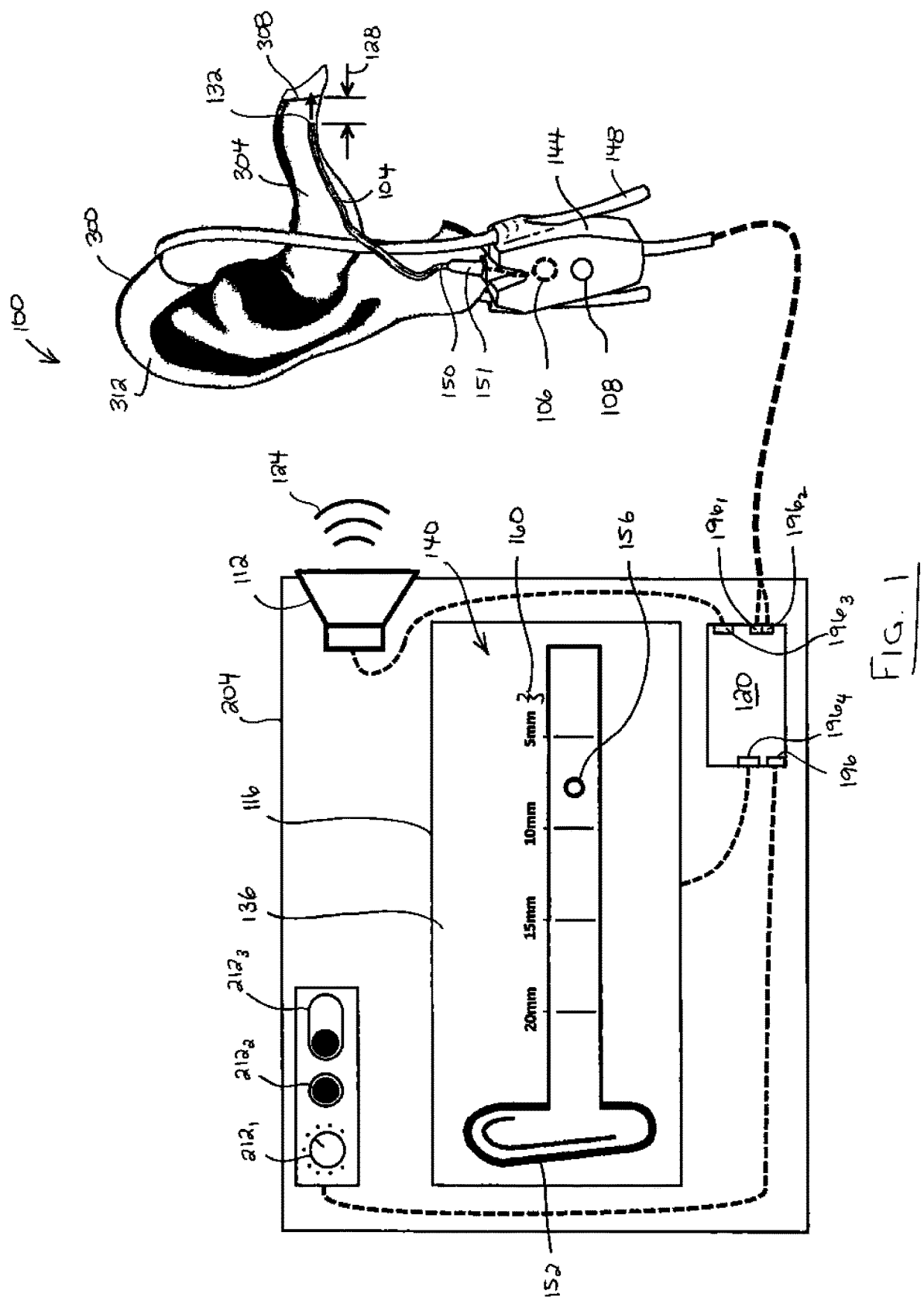
FIG. 1 is a schematic illustration of a probe insertion apparatus in use with a patient's ear, in accordance with an embodiment.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a first element is said to be 'communicatively coupled to' or 'communicatively connected to' or 'connected in communication with' a second element where the first element is configured to send or receive electronic signals (e.g. data) to or from the second element, and the second element is configured to receive or send the electronic signals from or to the first element. The communication may be wired (e.g. the first and second elements are connected by one or more data cables), or wireless (e.g. at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g. SPI, $I^2C$, Bluetooth™, or IEEE™ 802.11).

As used herein and in the claims, a group of elements are said to 'collectively' perform an act where that act is performed by any one of the elements in the group, or performed cooperatively by two or more (or all) elements in the group.

As used herein and in the claims, an act is said to occur "continuously" where it occurs continually (i.e. without pause or interruption) or repeatedly (e.g. many times, at a constant or variable frequency). For example, a signal may be received "continuously" over a period of time, where the signal is received as an continuous, uninterrupted analog signal, or an intermittent digital signal (e.g. pulsing between low and high signals to represent digital bits).

Some elements herein may be identified by a part number, which is composed of a base number followed by an alphabetical or subscript-numerical suffix (e.g. 112a, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

Within the ear canal, incident sound and reflected sound (e.g. reflected off the tympanic membrane at the proximal end of the ear canal) produce standing waves that cause the sound pressure level to vary along the ear canal. To accurately measure ear canal acoustics with real ear measurement, the probe tube should be placed so that the sound receiving end of the probe tube is within a particular range of distances (e.g. 3-8 mm, and more preferably 4-7 mm) from the tympanic membrane (also referred to as 'tympanic spacing', 'tympanic distance', 'tympanic probe spacing, or 'tympanic probe distance').

Contact between the probe tube and the tympanic membrane can create intense discomfort for patients. Therefore, moving the probe tube into contact with the tympanic membrane and retracting the desired distance is not a good solution for ensuring proper tympanic spacing. Instead, clinicians typically rely on visual inspection and other complex methods for positioning the probe tube with the desired tympanic spacing. Such complexity is one reason why some clinicians are reluctant to adopt real ear measurement. This may be particularly true for clinicians without medical training, such as lay staff at a hearing aid kiosk.

Embodiments herein relate to a probe insertion apparatus for real ear measurement that does not require or rely upon calibration measurements of tympanic distance. The apparatus may provide real time feedback to an operator (e.g. clinician) of the tympanic distance as the operator inserts the probe tube into the patient's ear canal towards the tympanic membrane. For example, the apparatus may include a display of the tympanic distance that updates automatically as the probe tube is moved towards the tympanic membrane. This allows the operator to easily monitor the tympanic distance as the probe tube is being inserted, and to stop inserting the probe tube when the apparatus indicates that the target tympanic distance (e.g. 4-7 mm) has been reached. This avoids any need for the operator to perform visual inspection or other complex techniques to achieve the target tympanic distance. Therefore, the apparatus disclosed herein may reduce the skill required to perform real ear measurement, which may promote greater adoption particularly by operators without medical training (e.g. lay staff at a hearing aid kiosk).

FIG. 1 shows a probe insertion apparatus 100. As shown, apparatus 100 may include a probe tube 104, a measurement microphone 106, a reference microphone 108, a reference speaker 112, an operator feedback device 116, and a controller 120.

In use, an operator slowly inserts probe tube 104 into the ear canal 304 of a patient 300 towards their tympanic membrane 308. At the same time, reference sound 124 is emitted by reference speaker 112 towards the user's ear 312. Reference microphone 108 is positioned outside of ear canal 304 adjacent to ear canal 304 where reference microphone 108 senses reference sound 124, and in response sends reference signals to controller 120. Reference sound 124 also enters ear canal 304. Inside ear canal 304, reference sound 124 reflects off of tympanic membrane 308. The reflected sound enters probe tube 104. Probe tube 104 is sonically coupled to measurement microphone 106, which senses the reflected sound, and in response sends tympanic reflection signals to controller 120.

As the operator is moving probe tube 104 towards tympanic membrane 308, controller 120 continuously (e.g. repeatedly or continually) determines a tympanic distance 128 between a sound receiving end 132 of probe tube 104 and tympanic membrane 308, and directs operator feedback device 116 to provide indicia of the determined tympanic distances 128. For example, operator feedback device 116 may include a display 136, and controller 120 may continuously direct display 136 to update indicia 140 of the tympanic distance shown on display 136. The operator may reference indicia 140 as it is updated to determine when probe tube 104 has a targeted tympanic distance 128, and therefore when to stop moving probe tube 104 towards tympanic membrane 308.

Controller 120 may determine tympanic distance 128 absent reference to calibration measurements of tympanic distance. For example, the operator may not be tasked with taking manual calibration measurements of tympanic distance (e.g. visual or contact-based tympanic measurements), to be used by controller 120 as a basis for subsequent measurements made during probe tube insertion.

Probe tube 104 may be any sound conduit suitable for channeling sound from a sound receiving end 132 located within the ear canal 304 proximate a patient's tympanic membrane 308, to a reference microphone 108 located outside the ear canal 304. For example, probe tube 104 may be a flexible hollow tube, such as a silicone or plastic tube. In some embodiments, probe tube 104 has an outer diameter of less than 1 mm (e.g. 0.3 to 0.7 mm), and an inner diameter of less than 0.7 mm (e.g. 0.15 to 0.5 mm). Probe tube 104 may have any length sufficient to extend from proximate tympanic membrane 308 to a measurement microphone 106 located outside of ear canal 304. For example, probe tube 104 may be at least 5 cm long (e.g. 5 to 30 cm).

Microphones 106, 108 may be any devices suitable for sensing reflection and reference sound respectively, and sending tympanic reflection and reference signals to controller 120. For example, microphones 106, 108 may include condenser and/or electret microphones. As shown, microphones 106, 108 may be located outside of ear canal 304. This mitigates microphones 106, 108 obstructing sound propagation along ear canal 304.

In some embodiments, microphones 106, 108 may be provided in a common microphone housing 144 as shown. For example, microphone housing 144 containing microphones 106, 108 may be attached (e.g. suspended) from the user's ear 312. In the illustrated example, microphone housing 144 is suspended from ear 312 by an adjustable cord 148. In other embodiments, each microphone 106, 108 may be separately housed and supported (e.g. attached) proximate ear canal 304.

Measurement microphone 106 may be configured to sense reflected sound channeled by probe tube 104. For example, probe tube 104 may include a sound output end 150 sonically coupled to measurement microphone 106. In the illustrated example, a connector 151 mechanically and sonically joins sound output end 150 to measurement microphone 106 to provide a reliable and efficient transmission of reflection sound from sound output end 150 to measurement microphone 106.

Reference microphone 108 may be positioned and oriented to sense reference sound emitted by reference speaker 112. For example, reference microphone 108 may be oriented outwardly (i.e. away from the patient) as shown. In the illustrated example, reference microphone 108 is oriented outwardly away from tympanic membrane 308 to receive reference sound with substantially no interference from reflected sound (i.e. sound reflected from tympanic membrane).

Reference speaker 112 can be any device suitable to emit reference sound towards a patient's ear 312. The reference sound may include broadband sound spanning at least 3000 Hz to 16000 Hz. In general, sound waves below 3000 Hz may be too long to be useful for determining tympanic distance. Although not strictly necessary (and may not be the case in some embodiments), the reference sound is preferably a broadband stimulus that is statistically stationary (i.e. has statistical properties, such as mean, variance, etc. which are relatively constant over time).

Operator feedback device 116 can be any device suitable to provide sensible (i.e. perceivable by an operator's senses) indicia 140 of tympanic distance 128. Indicia 140 is continuously (e.g. repeatedly or continually) updated at the direction of controller 120 to reflect the tympanic distance 128, which is changing continually from moment to moment as the operator moves probe tube 104 towards tympanic membrane 308. Operator feedback device 116 may provide one or more (or all) of auditory, visual, and haptic indicia of tympanic distance 128. FIGS. 1-5 illustrate several embodiments of apparatus including operator feedback devices 116 that provide various indicia. These examples may be combined in any combinations or sub-combinations in various embodiments that provide two or more of these indicia.

FIG. 1 shows an example in which operator feedback device 116 includes a display 136 that provides visual indicia 140. Visual indicia 140 may visually represent tympanic distance 128 in any manner, such as for example graphically as shown, symbolically (e.g. with symbols representing proximity to the targeted tympanic distance), numerically (e.g. a distance readout), by color-coding (e.g. continual color spectrum or discrete color bands), or blinking (e.g. blink frequency changes with tympanic distance or proximity to a target tympanic distance). Visual indicia 140 may be digital as shown. Alternatively, operator feedback device 116 may provide analog indicia (e.g. an analog gage), or include both digital and analog indicia. Visual indicia 140 may provide an absolute measurement (e.g. indication of distance from tympanic membrane 308) or a relative measurement (e.g. indication of distance to a targeted tympanic distance).

In the illustrated embodiment, visual indicia 140 include a graphic representation 152 of an ear canal, and an indicator 156 positioned with respect to the graphical representation 152 (e.g. overlaid on the graphical representation as shown) to indicate tympanic distance 128. As shown, visual indicia 140 may further include numeric measurements 160 that allow tympanic distance 128 to be determined by reference to the position of indicator 156. While the operator moves probe tube 104 towards tympanic membrane 308, controller 120 may direct display 136 to update to move the position of indicium 140 along graphical representation 152 to reflect the tympanic distance 128 from moment to moment.

Figure 2:
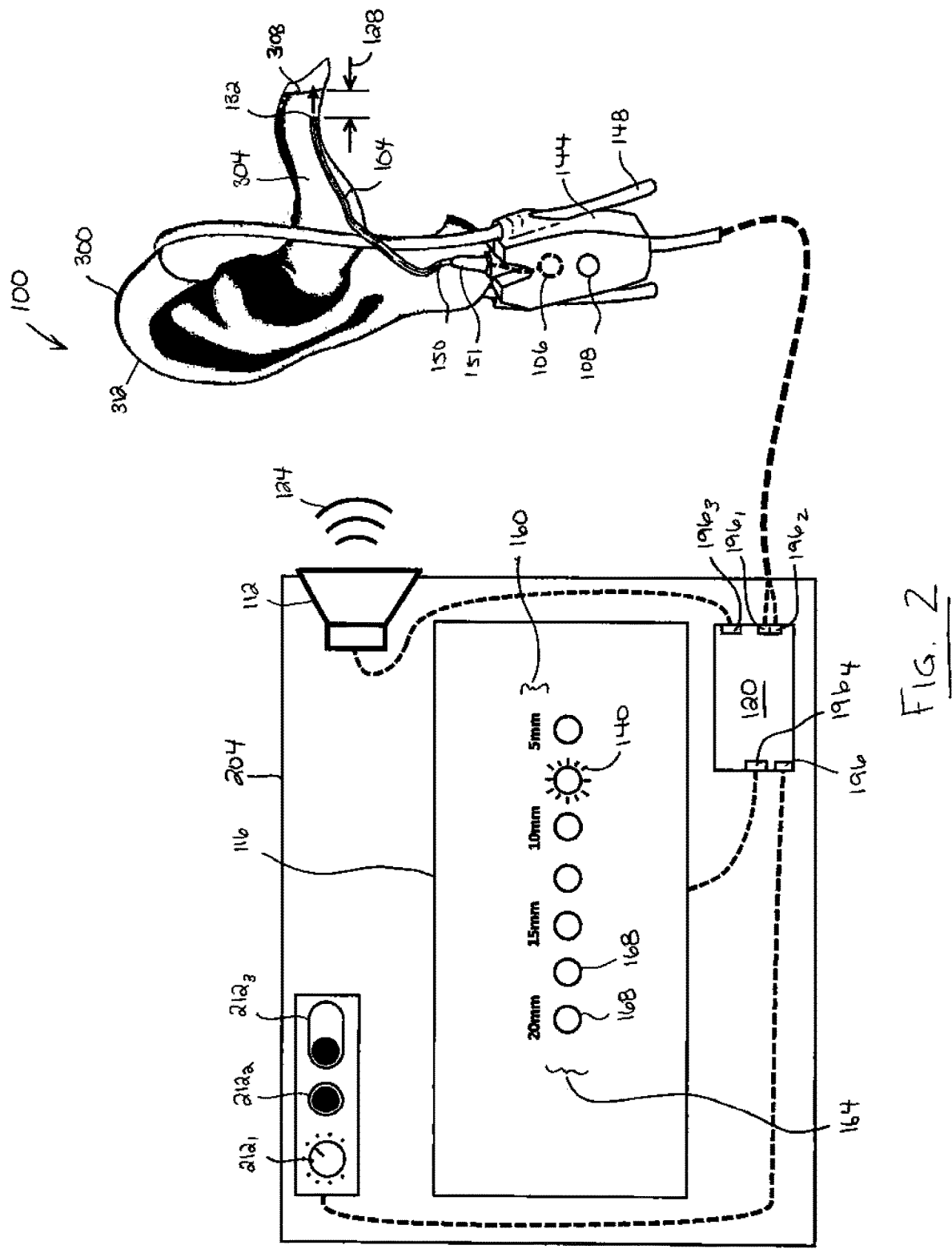
FIG. 2 is a schematic illustration of a probe insertion apparatus in use with a patient's ear, in accordance with an embodiment.

FIG. 2 shows another example in which operator feedback device 116 includes a row 164 of lights 168. In this example, visual indicia 140 include the illumination of a particular light 168, and numeric measurements 160 identifying a relative or absolute tympanic distance associated with an illuminated light 168. While the operator moves probe tube 104 towards tympanic membrane 308, controller 120 may direct row 164 of lights 168 to update by illuminating a different one of lights 168 to reflect the tympanic distance 128 from moment to moment.

It will be appreciated that operator feedback device 116 may have a limited resolution. For example, the row 164 of lights 168 shown in FIG. 2 are illustrated with an accuracy of 2.5 mm, such that controller 120 may round determinations of tympanic distance to the nearest 2.5 mm increment when directing operator feedback device 116 to update. Furthermore, controller 120 may not direct operator feedback device 116 to update after every determination of tympanic distance 128. For example, where a change in tympanic distance 128 would not change the indicia of operator feedback device 116 (e.g. because of the resolution/accuracy of operator feedback device 116) then directions from controller 120 to operator feedback device 116 may be withheld.

Figure 3:
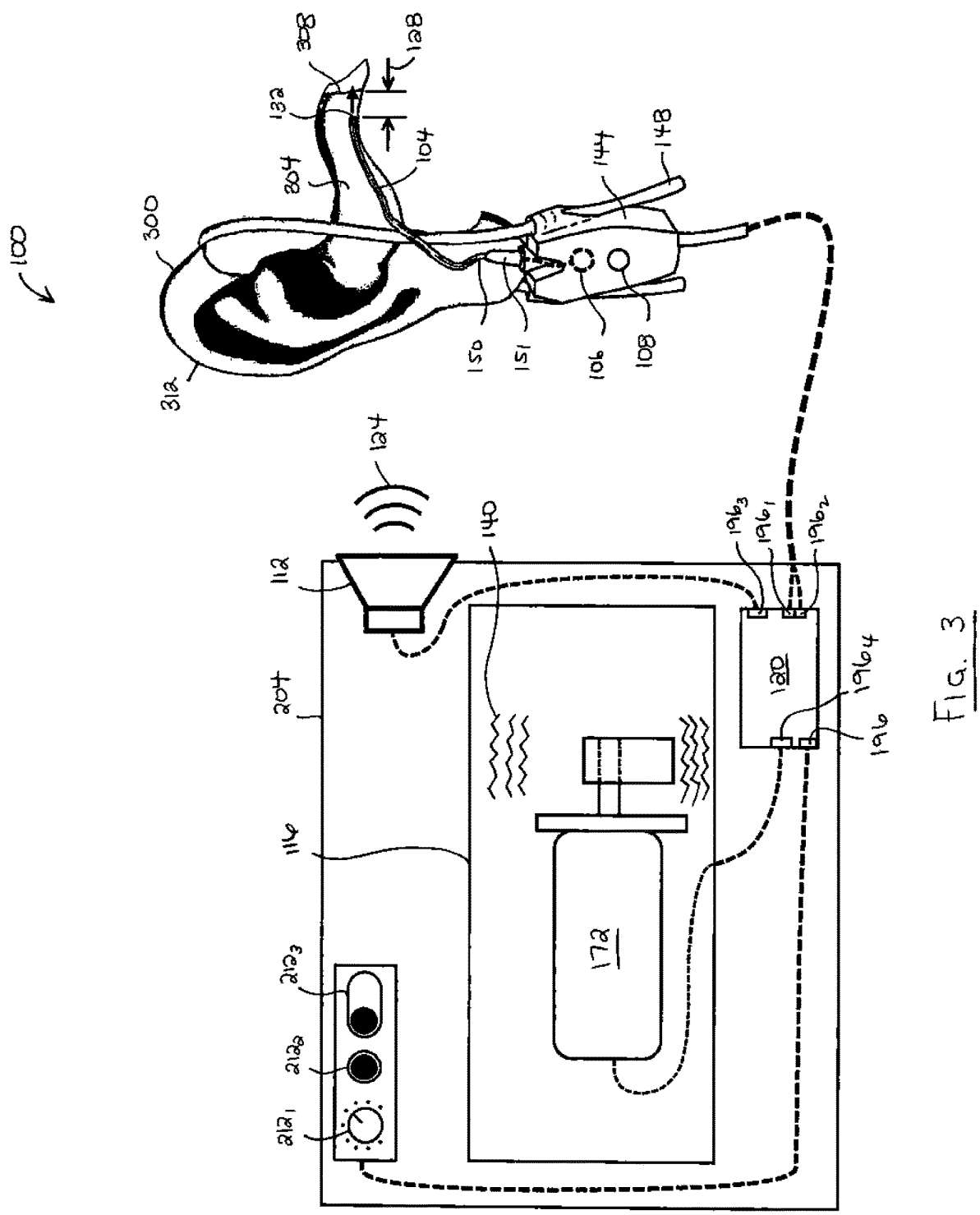
FIG. 3 is a schematic illustration of a probe insertion apparatus in use with a patient's ear, in accordance with an embodiment.

FIG. 3 shows an example in which operator feedback device 116 provides haptic indicia 140. For example, operator feedback device 116 may include a vibrator 172. Vibrator 172 may be any device suitable to provide vibrations indicative of tympanic distance 128. For example, vibrator 172 may include an offset motor (also known as an eccentric rotating mass vibration motor) as shown, a linear resonant actuator, and/or a piezo electric vibrator. Vibrator 172 may indicate tympanic distance 128, in absolute or relative terms, in any manner, such as for example by vibration intensity, frequency of vibration pulses, or vibration pattern (e.g. Morse code, or similar). While the operator moves probe tube 104 towards tympanic membrane 308, controller 120 may direct vibrator 172 to update the vibration produced (e.g. intensity, frequency, and/or pattern) to reflect the tympanic distance 128 from moment to moment.

Figure 4:
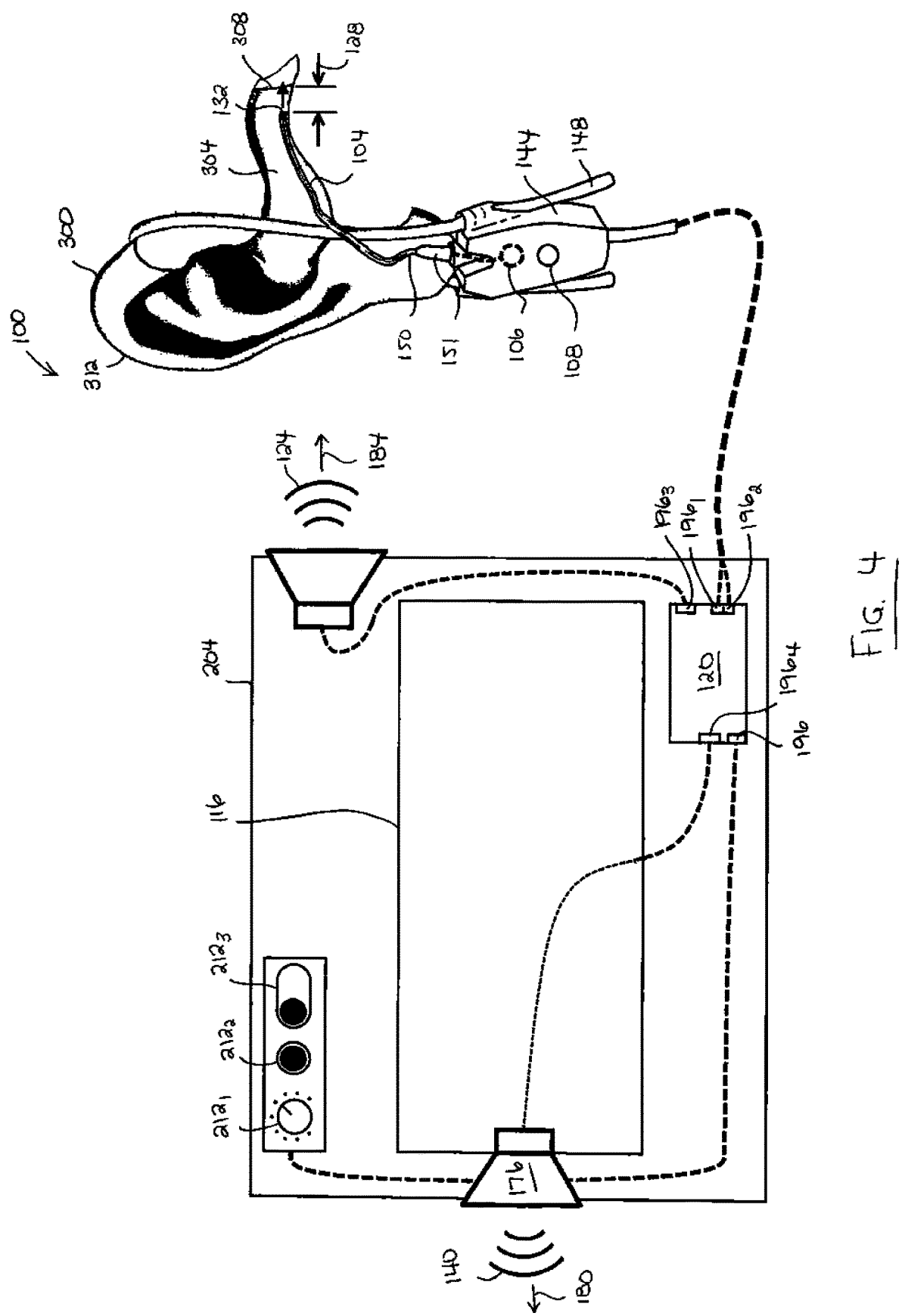
FIG. 4 is a schematic illustration of a probe insertion apparatus in use with a patient's ear, in accordance with an embodiment.

FIG. 4 shows an example in which operator feedback device 116 provides auditory indicia 140. Operator feedback device 116 may provide auditory indicia 140 in any manner that does not conflict with reference sound 124. In the illustrated example, operator feedback device 116 includes a feedback speaker 176 (e.g. loud speaker, or wearable audio device, such as headphones or earphones). Controller 120 may direct feedback speaker 176 to emit auditory indicia 140. Auditory indicia 140 may auditorily (i.e. with sound) represent tympanic distance 128 in any manner. Auditory indicia 140 may indicate tympanic distance 128 in absolute terms (e.g. distance from tympanic membrane 308) or relative terms (e.g. proximity to target tympanic distance). Auditory indicia 140 may indicate tympanic distance 128 by value (e.g. identifying a specific distance measurement, such as "6 mm"), or qualitatively (e.g. identifying proximity to tympanic membrane or a target tympanic distance in a way that does not specifically communicate a distance measurement). Auditory indicia 140 may indicate tympanic distance 128 with spoken words, such as "seven millimeters", or "getting closer" for example. Alternatively or in addition, auditory indicia 140 may indicate tympanic distance with non-verbal sounds, such as sound frequency (e.g. pitch increases or decreases based on tympanic distance), sound pattern (e.g. pattern of tones or beeps changes based on tympanic distance), and/or volume (e.g. volume increases or decreases based on tympanic distance). Auditory indicia 140 may include a special alert (verbal or non-verbal) when the target tympanic distance is reached. While the operator moves probe tube 104 towards tympanic membrane 308, controller 120 may direct feedback speaker 176 to update the sound produced (e.g. verbal and/or non-verbal sounds) to reflect the tympanic distance 128 from moment to moment. An advantage of auditory indicia 140 is that it allows the operator to keep their visual attention on the patient while moving probe tube 104.

Operator feedback device 116 may be configured to produce auditory indicia 140 that does not conflict with reference sound 124. This allows auditory indicia 140 to be sounded while reference sound 124 continues to play and while the operator continues to move probe tube 104 towards tympanic membrane 308. In some embodiments, operator feedback device 116 includes a wearable audio device, such as headphones or earphones, that emit indica 140 directly into the operators ears. Alternatively or in addition, feedback speaker 176 may be a loudspeaker oriented to emit auditory indicia 140 away from the patient's ear 312. For example, feedback speaker direction 180 may be oriented at an angle of at least 45 degrees (i.e. 45 to 315 degrees) from reference speaker direction 184. This may substantially mitigate feedback sound 140 from contaminating the reference and tympanic reflection signals that controller 120 relies upon for determining tympanic distance 128.

Alternatively or in addition to orienting feedback speaker 176 to emit auditory indicia 140 away from the patient's ear 312, auditory indicia 140 may be composed of sound frequencies that are all outside (e.g. above or below, and preferably below) the sound frequencies of reference sound 124. This allows microphones 106, 108 and/or controller 120 to filter out auditory indicia 140 so that it does not contaminate the reference and tympanic reflection signals that controller 120 relies upon for determining tympanic distance 128. For example, auditory indicia 140 may be limited to sound frequencies less than 3000 Hz (e.g. 20 Hz to 3000 Hz). Having regard to these limitations, auditory indicia 140 should include sound frequencies with the range of normal human hearing (e.g. 20 Hz to 20000 Hz) so that the operator can perceive the auditory indicia 140.

Figure 5:
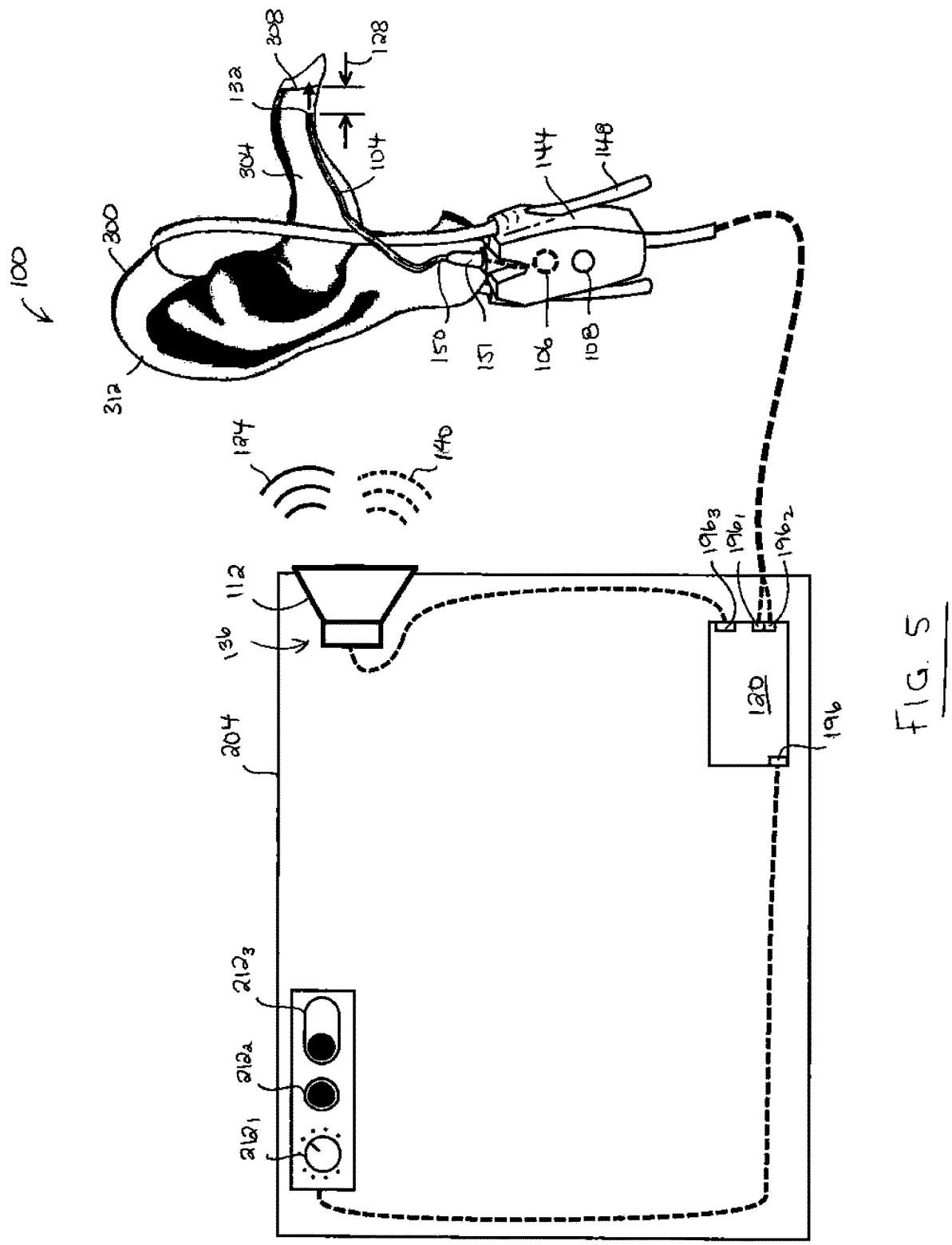
FIG. 5 is a schematic illustration of a probe insertion apparatus in use with a patient's ear, in accordance with an embodiment.

FIG. 5 shows an example in which controller 120 directs reference speaker 112 to product auditory indicia 140. For example, auditory indicia 140 may be composed of sound frequencies that are all outside of the sound frequencies of reference sound 124. In this way, reference speaker 112 may also be an operator feedback device 116. Therefore, an advantage of this design is that it does not require a separate feedback speaker to produce auditory indicia 140, which may reduce the cost, size, and weight of apparatus 100.

Figure 6:
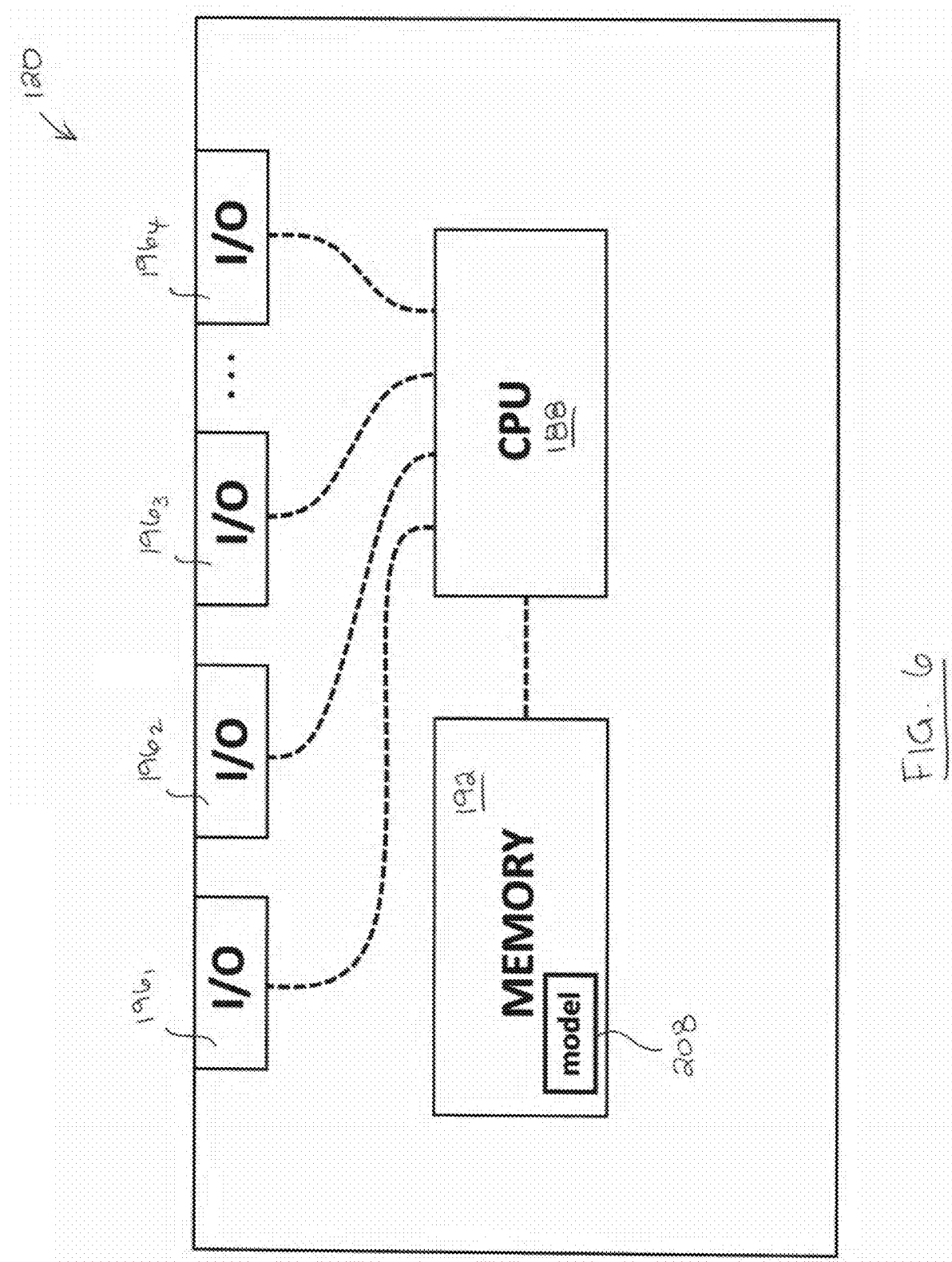
FIG. 6 is a schematic illustration of a controller, in accordance with an embodiment.

Reference is now made to FIGS. 1 and 6. As shown, controller 120 may include a processor 188, memory 192, and a plurality of I/O 196 (also referred to as "interfaces" 196). Interfaces 196 may include a measurement microphone input $196_1$ for receiving tympanic reflection signals from measurement microphone 106, a reference microphone input $196_2$ for receiving reference signals from reference microphone 108, and a reference speaker output $196_3$ for sending directions to reference speaker 112 to emit reference sound. Controller 120 may also include an operator feedback device output for sending directions to an operator feedback device 116 to provide indicia of tympanic distance 128. Operator feedback device output may be a discrete interface $196_4$ (e.g. where operator feedback device 116 is discrete from reference speaker 112), or may be provided by interface $196_3$ (e.g. where operator feedback device 116 includes reference speaker 112, and reference speaker 112 is used to produce auditory indicia of tympanic distance 128). Accordingly, measurement microphone input $196_1$ may be communicatively coupled to measurement microphone 106, reference microphone input $196_2$ may be communicatively coupled to reference microphone 108, reference speaker output 196₃ may be communicatively coupled to reference speaker 112, and operator feedback device output 196₃ or 196₄ may be communicatively coupled to operator feedback device 116 (e.g. which may or may not be/include reference speaker 112).

In some embodiments, one or more (or all) of interfaces 196 may provide removable connections to the devices (e.g. microphones, speakers, or feedback device) with which they are communicatively coupled. An advantage to a removable connection is that it can allow controller 120 to be supplied (e.g. sold) separately of the device(s), whereby the operator can provide their own device(s) (e.g. microphone, speaker, or feedback device) thereby reducing the size, weight, and cost of the apparatus. This can also allow controller 120 to replaced (e.g. as newer models are released) without having to replace the peripheral device(s) connected by removable connections. Interface(s) 196 may include any removable connection suitable for communicative coupling with the associated peripheral device, such as for example a male or female electrical connector (e.g. RCA, 3.5 mm, HDMI, DVI, DP, USB, banana connector, spade connector, or euroblock). Alternatively, or in addition, one or more (or all) of interfaces 196 may have hardwired, non-removable connections (e.g. soldered wire or PCB trace) to their associated peripheral device. As compared with removable connections, this may improve signal quality.

In FIG. 1, controller 120, reference speaker 112, and operator feedback device 116 are illustrated as being provided in a single housing 204. An advantage of this design is that it may be more compact, and reduce the need for the operator to decide how to arrange these components. In alternative embodiments, one or more (or all) of controller 120, reference speaker 112, and operator feedback device 116 may have separate housings. An advantage of this design is that it provides greater flexibility in the position and arrangement of these components. For example, reference speaker 112 may be positioned and oriented to direct sound towards the patient's ear 312, and operator feedback device 116 may be positioned and oriented where the operator can best perceive the provided indicia 140 of tympanic distance 128.

Processor 188 may be any processing device suitable for determining tympanic distance 128 based on reference and tympanic reflection signals from microphones 108, 106 respectively. For example, processor 188 may include one or more ARM, RISC, Intel™, or AMD™ microprocessors, or integrated circuits (e.g. fixed or FPGA (field programmable gate array)).

Memory 192 may include volatile memory (e.g. RAM) and/or non-volatile memory (e.g. flash memory). Memory 192 may store computer executable instructions (also referred to as computer readable instructions) that when executed by processor 188, configure processor 188 to perform the functions and methods described herein. Memory 192 may include local storage (connected by wire or wirelessly to processor 188), and/or remote storage (connected to processor 188 across a network, such as the Internet). Accordingly, as used herein and in the claims, content is "stored" in memory, where that content is stored in local storage, remote storage, or distributed across both local and remote storage, unless explicitly specified (e.g. "remotely stored" or "locally stored"). In addition, although aspects of controller 120 are described as being stored in memory, one skilled in the art will appreciate that these aspects can also be stored on or read from other types of volatile or non-volatile computer program products or computer-readable media, such as secondary storage devices, including hard disks, floppy disks, CDs, or DVDs; a carrier wave from the Internet or other network; or other forms of RAM or ROM.

Returning to FIGS. 1 and 6, controller 120 may automatically (i.e. without human interaction) continuously determine tympanic distance 128 based on reference and tympanic reflection signals from microphones 108, 106 respectively. As shown, memory 192 may store a model 208 trained by machine learning. Controller 120 may supply inputs (based upon the reference and tympanic reflection signals) to model 208, and model 208 may output an indication of tympanic distance 128. Processor 188 may output directions to operator feedback device 116 to produce indicia of tympanic distance 128 based on the output of model 208.

Model 208 is preferably a recurrent neural network model for reasons described as follows. Traditional neural networks have many layers, each layer having several neurons that transform an input to desired a output. Using a mathematical technique known as "backpropagation", error propagation is calculated, and the error is reduced by an error regression model. Accordingly, traditional neural network models employ a "feed forward" design, in which the same input always generates the same output.

In contrast, in a recurrent neural network each neuron is different and depends on (i) a given input, and (ii) the neuron's internal state ("memory") at the time of that input. This allows a recurrent neural network to exhibit temporal dynamic behavior. The logic of each neural has two inputs instead of one—the first input is the newly provided input, and the second is the neuron's previous state. In this way, historical state information is retained within the network.

A recurrent neural network is more efficient and stable at making continuous determinations of tympanic distance 128 simultaneously as the operator moves probe tube 104 towards tympanic membrane 308 because each distance determination is highly correlated to the previously determined distance. Probe tube 104 cannot teleport. Probe tube 104 will always be in close proximity to where probe tube 104 was at the previous time interval. This allows the recurrent neural network model to better simulate the physical characteristics of probe tube insertion. This also makes a recurrent neural network model more stable and compact in this application.

In alternative embodiments, it is technically possible, if much less efficient, for model 208 to employ a feed forward network design. As compared to a recurrent neural network, the feed forward network would need to be far larger to account for all possible conditions. Further, a feed forward network may be less stable and reliable because the distance determination made at every time step is independent, which could result in erroneous determinations (e.g. probe tube 104 appearing to impossibly teleport).

An exemplary method of training recurrent neural network model 208 is described as follows.

Figure 7:
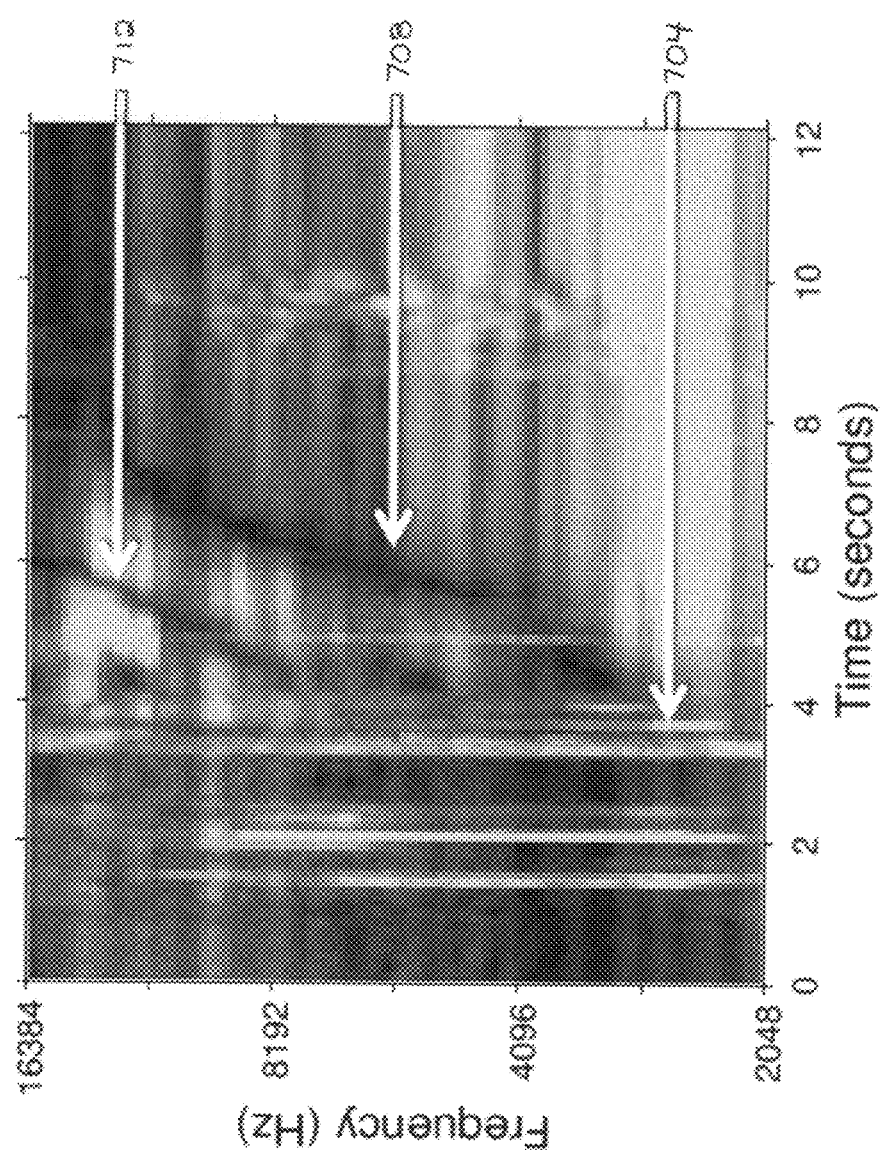
FIG. 7 is a spectrograph of tympanic reflection sound, measured while inserting a probe into a patient's ear canal.

Recordings were made through the probe tube microphone of a Verifit™ 2 REM system. A clinician inserted the probe tube into the ear canal while a loudspeaker presented a shaped reference sound. Both ear canals of 55 subjects presenting with normal outer ear function were evaluated. From each recording, a spectrogram was generated. An example spectrogram 700 is shown in FIG. 7. Spectrogram 700 shows noise 704 caused by handling the probe tube, minima 708 where cancellations occur due to ¼ wavelength reflection, and minima 712 where cancellations occur due to ¾ wavelength reflection.

Figure 8:
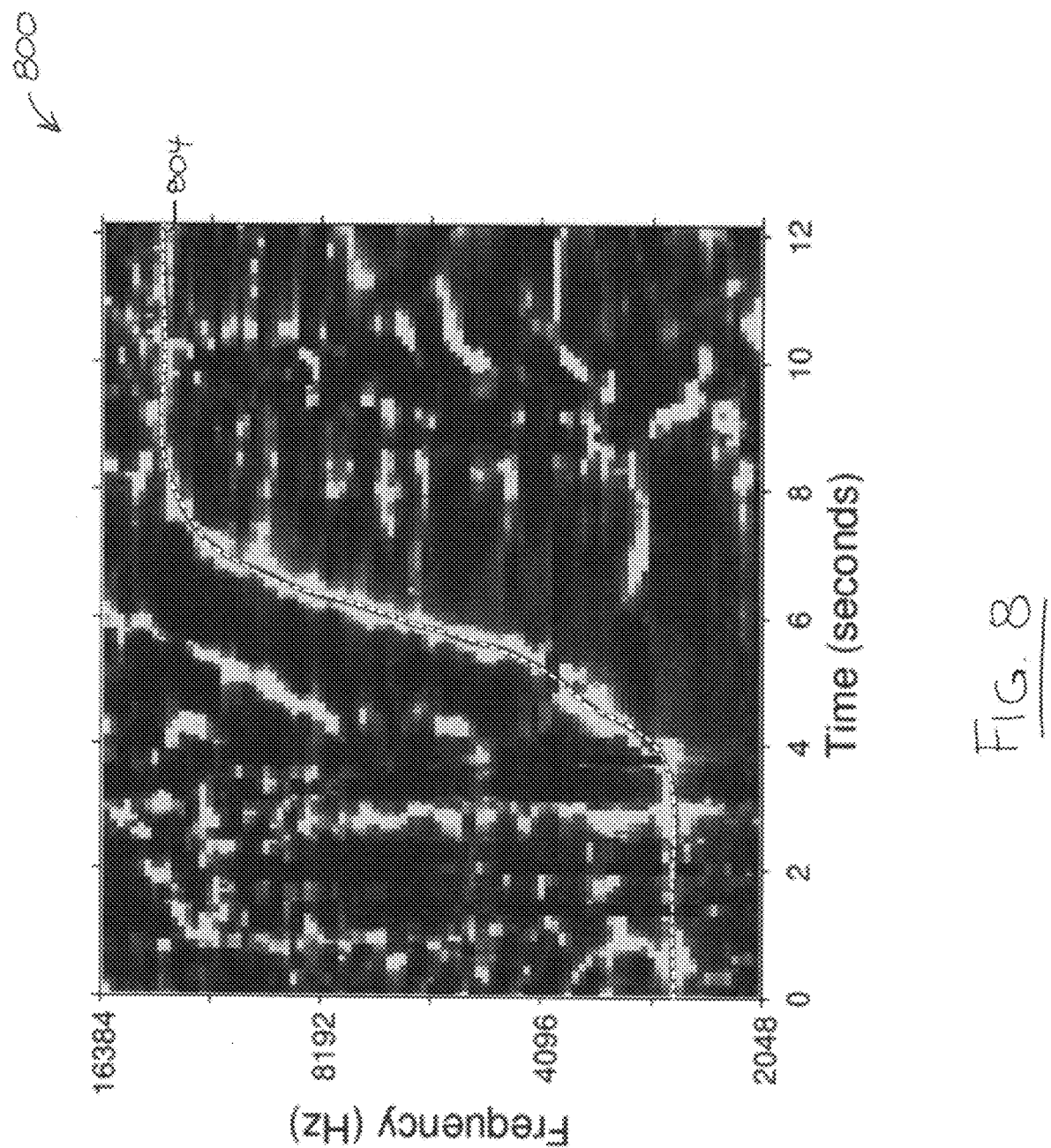
FIG. 8 is the spectrograph of FIG. 7 processed through a rank-ordering filter.

The spectrogram is process through a rank-ordering filter to highlight regions representing the local minima in the spectrogram. FIG. 8 shows an example spectrogram 800 generated by applying the rank-ordering filter to the spectrogram 700 of FIG. 7. Spectrogram 800 includes minima 804 (manually labelled with a dashed-line). The frequency at which these minima occur correspond to the tympanic distance at the corresponding point in time. In this example, a plot digitizer was used to convert the line 804 to tabular data for recurrent neural network training.

Although various mathematical techniques may be used to determine the tympanic distance where the minima occur, the following is one example:

$$\lambda = \frac{c}{f}$$

where λ is wavelength, c is an estimate of the speed of sound in the ear canal (approximately 350 meters per second), and f is sound frequency. In this example, tympanic distance (d) may be equal to ¼ of the wavelength of the frequency at which the minima occurs:

$$d = \frac{\lambda}{4} = \frac{c}{4f}$$

When a sound wave travels a total distance of λ/2, the phase of the wave is exactly inverse. At the position of the probe tube, there is a wave at some frequency f that travels λ/4 to the ear drum. A portion of the energy is reflected back and travels λ/4 to the probe position for a total distance of λ/2. Since the incident wave and reflected wave at the position of the probe tube sound receiving end have inverse phase, they destructively interfere producing the minima seen in spectrogram 800.

Figure 9:
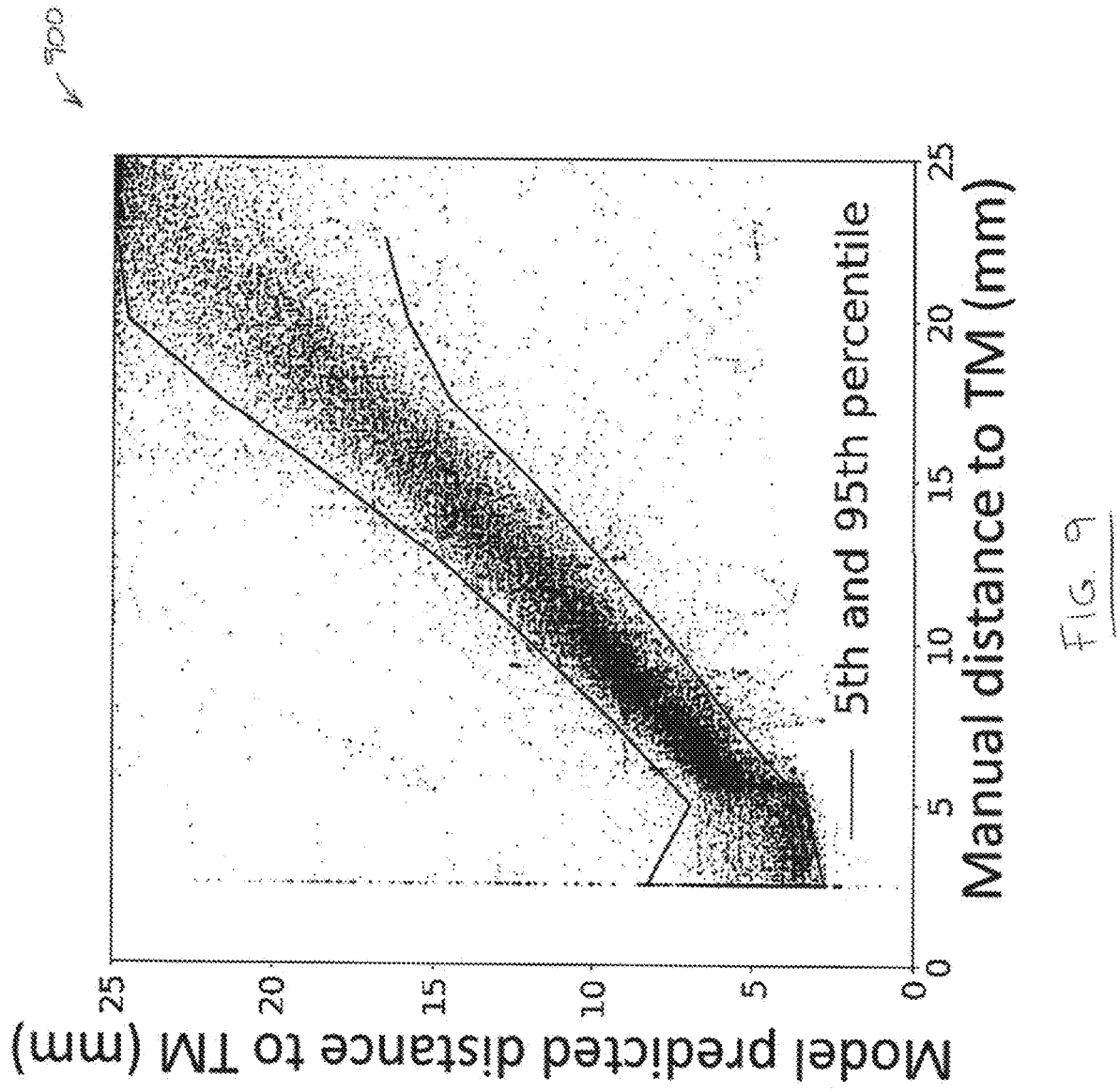
FIG. 9 is a scatter plot of 5-fold cross validation test predictions compared against manually determined tympanic distance.

A Gated Recurrent Unit recurrent neural network model was trained on sequences of input spectra to produce an estimate of the tympanic distance for every time step (many-to-many configuration). In this example, the selected model architecture included 77 inputs, 60 neurons at layer 1, 40 neurons at layer 2, 40 neurons at layer 3, 20 neurons at layer 4, and 1 output. The data generated from the 55 subjects was used to train the model. To validation the model, 5-fold cross-validation was used—in which 5 models were generated, each based on 80% of the patient spectrum data. FIG. 9 shows a scatter plot 900 of the 5-fold cross validation test predictions compared against manually labelled tympanic distance. This scatter plot validated the accuracy of the model's predictions of tympanic distance.

Figure 10:
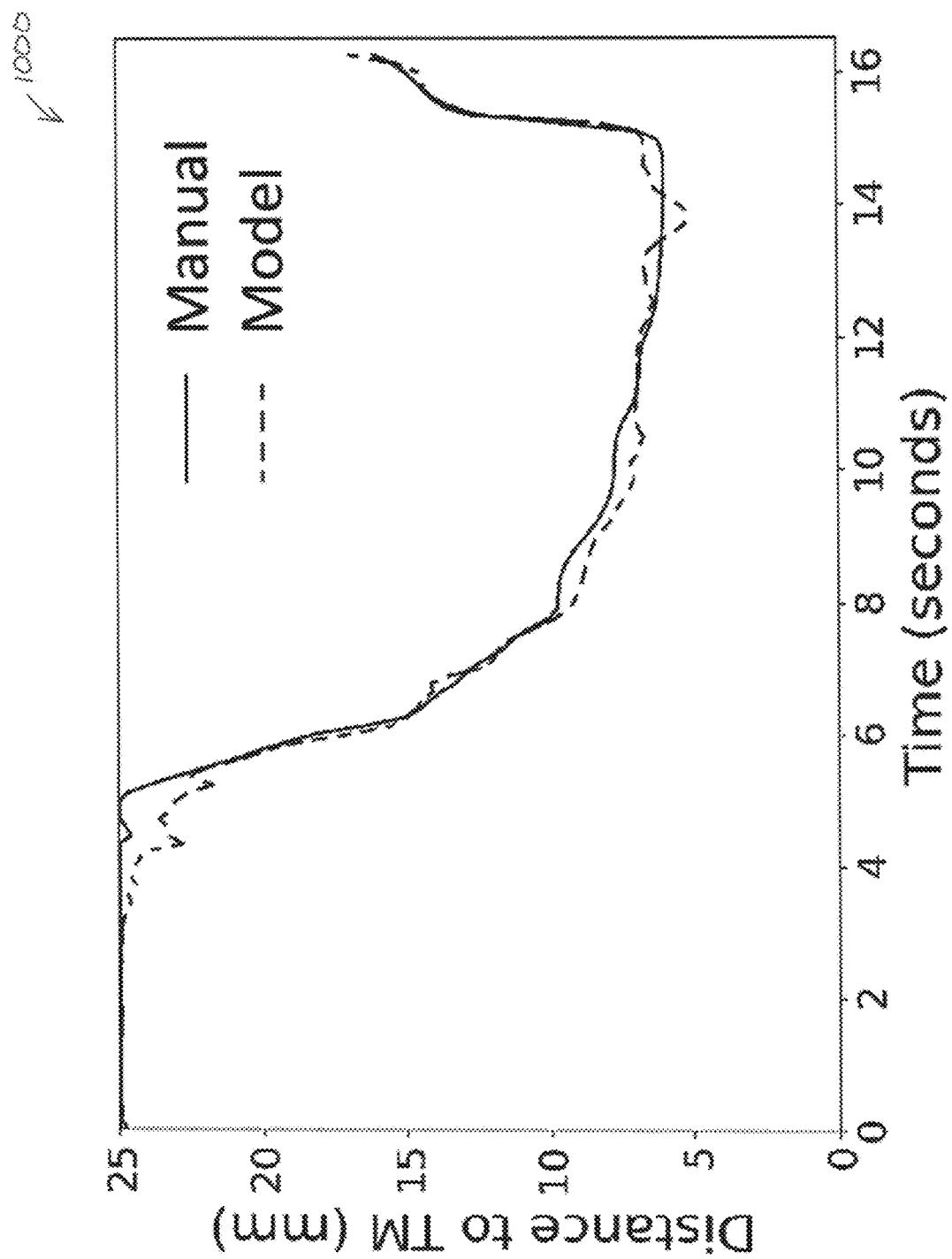
FIG. 10 is a line graph comparing tympanic distance predicted by a trained model against tympanic distance manually determined, as an operator moved the probe tube within a patient's ear canal.

FIG. 10 shows a line graph 1000 illustrating an example of the trained model 208 (FIG. 6) successfully tracking the tympanic distance as an operator moved the probe tube within a patient's ear canal. As shown, the tracking error is consistently very low (e.g. less than 1 mm).

Returning to FIGS. 1 and 6, apparatus 100 may include one or more user inputs 212. A user input 212 may be any device that can receive input from a user, such as for example a dial $212_1$, a button $212_2$, a switch $212_3$, or a touch screen. Controller 120 may include additional interface(s) 196 to receive signals from user input(s) 212. In use, an operator may interact with user input(s) 212 to direct the operation of apparatus 100. For example, a user input 212 may be manipulated by an operator to direct controller 120 to begin automatically continuously determining tympanic distance 128.

Still referring to FIGS. 1 and 6, in some embodiments controller 120 may monitor the tympanic reflection signals for indications that the probe tube has become blocked in the ear canal. The blockage may prevent proper reception of the tympanic reflection sound by measurement microphone 106, and therefore prevent controller 120 from accurately determining tympanic distance 128. For example, a volume characteristic of the tympanic reflection signals may drop off in the event that the probe tube becomes jammed on a wall of the ear canal 304 or encounters a bundle of earwax (cerumen). In some embodiments, controller 120 (e.g. processor 188 may execute computer readable instructions to) detect a blockage of probe tube 104 based on a volume characteristic of the tympanic reflection signals. For example, controller 120 may detect a blockage based on one (or, more preferably both of):

(a) the tympanic reflection signals indicating a sound level at the probe tube sound receiving end 132 that is less than the reference sound level (as indicated by the reference signals) by a threshold difference (e.g. by at least 5 dB, by at least 10 dB, or by at least 50% of the reference sound level), and (b) the tympanic reflection signals indicating a sound level at the probe tube sound receiving end 132 that is less than a threshold level (e.g. less than 10 dB).

Conditions (a) and (b) above may be determined based on any portion or the entirety of the broadband sound wave frequencies. In some embodiments, conditions (a) and (b) are assessed solely based on sound frequencies below 500 Hz (e.g. 20 Hz to 500 Hz). Without being limited by theory, it is thought that at such low frequencies, there ought to be substantially no difference between levels indicated by the reflection and reference signals since the wavelengths are substantially larger than the distance between the reference microphone 108 and probe tube sound receiving end 132. If there was a probe tube blockage, then the tympanic reflection signals would indicate a substantially lower sound level (condition (a) above).

However, condition (a) may also arise from an increase in measured level of the reference microphone 108, which may be the result of microphone 108 being bumped by a user's hand during probe insertion. In addition, when the signals at measurement microphone 106 are at or near the noise floor (i.e. ambient noise level), then a blockage may be indicated (condition (b) satisfied). However, this could also result from other conditions causing little low frequency energy from reaching the subject. In these situations the condition (a) will not be satisfied. Therefore, controller 120 may provide better reliability in determining probe tube blockages by making the determination based on both of conditions (a) and (b) being satisfied.

In response to determining a blockage, controller 120 may automatically direct operator feedback device 116 to provide an indicia (e.g. visual, auditory, or haptic) of the blockage. The operator may take corrective action in response to the indicia (e.g. clear the blockage by removing the earwax or readjusting the probe tube 104).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A probe insertion apparatus for real ear measurement, the apparatus comprising:
a probe tube having a sound receiving end positionable in an ear canal, and a sound output end sonically coupled to a measurement microphone;
a reference microphone positionable outside the ear canal;
a reference speaker positionable to emit reference sound towards the ear canal;
an operator feedback device;
a memory storing computer readable instructions; and
a processor configured to execute the computer readable instructions, wherein the computer readable instructions when executed configure the processor to:
direct the reference speaker to continuously emit the reference sound,
continuously receive reference signals from the reference microphone, and tympanic reflection signals from the measurement microphone,
continuously make determinations of a tympanic distance between the sound receiving end of the probe tube and a tympanic membrane based on the reference signals and the tympanic reflection signals and absent reference to a calibration measurement, as the operator moves the sound receiving end towards the tympanic membrane, and
automatically direct the operator feedback device to provide indicia of the tympanic distance between the sound receiving end of the probe tube and a tympanic membrane, as the operator moves the sound receiving end towards the tympanic membrane.

Item 2: The probe insertion apparatus of any preceding item, wherein:
each determination of the tympanic distance is based solely on the reference and tympanic reflections signals.

Item 3: The probe insertion apparatus of any preceding item, wherein:
each determination of the tympanic distance is based on current reference and tympanic reflection signals as well as reference and tympanic reflection signals used to determine a previous tympanic distance.

Item 4: The probe insertion apparatus of any preceding item, wherein:
the memory stores a neural network model, and
said continuously making determinations of the tympanic distance comprises continuously supplying the neural network model with inputs based on the received reference and tympanic reflection signals, and continuously receiving from the neural network model outputs corresponding to determined tympanic distances.

Item 5: The probe insertion apparatus of any preceding item, wherein:
the neural network model is a recurrent neural network model.

Item 6: The probe insertion apparatus of any preceding item, wherein:
the indicia comprise visual indicia.

Item 7: The probe insertion apparatus of any preceding item, wherein:
the operator feedback device comprises a display that provides the visual indicia.

Item 8: The probe insertion apparatus of any preceding item, wherein:
the visual indicia identify the determined tympanic distance.

Item 9: The probe insertion apparatus of any preceding item, wherein:
the display presents a graphical representation of an ear canal and an indicator positioned with respect to the graphical representation to indicate the tympanic distance.

Item 10: The probe insertion apparatus of any preceding item, wherein:
the indicia comprise one or more of auditory and haptic indicia.

Item 11: The probe insertion apparatus of any preceding item, wherein:
the operator feedback device comprises a notification speaker that emits auditory indicia, and
the notification speaker and reference speaker emit sound in different directions.

Item 12: The probe insertion apparatus of any preceding item, wherein:
the operator feedback device comprises the reference speaker, that when activated outputs the auditory indicia composed of feedback sound frequencies lower than the reference sound.

Item 13: The probe insertion apparatus of any preceding item, wherein the computer readable instructions when executed further configure the processor to:
detect a blockage of the probe tube in the ear canal based on a volume characteristic of the tympanic reflection signals.

Item 14: The probe insertion apparatus of any preceding item, wherein the computer readable instructions when executed further configure the processor to:
detect a blockage of the probe tube in the ear canal based on a volume characteristic of the tympanic reflection signals being indicative of (a) a reflection volume below a threshold volume and (b) the reflection volume being less than a reference volume by a threshold volume difference.

Item 15: The probe insertion apparatus of any preceding item, wherein:
the volume characteristic, the reflection volume, and the reference volume only relate to sound frequencies of 500 Hz or less.

Item 16: The probe insertion apparatus of any preceding item, wherein the computer readable instructions when executed further configure the processor to:
automatically direct the operator feedback device to provide an indicium of the blockage in response to detecting the blockage.

Item 17: A probe insertion apparatus for real ear measurement, the apparatus comprising:
a measurement microphone input;
a reference microphone input;
a reference speaker output;
an operator feedback device output;
a memory storing computer readable instructions; and
a processor configured to execute the computer readable instructions, wherein the computer readable instructions when executed configure the processor to:
send directions to the reference speaker output to continuously emit a reference sound, continuously receive reference signals from the reference microphone input, and tympanic reflection signals from the measurement microphone input, continuously make determinations of a tympanic probe distance based on the reference signals and the tympanic reflection signals and absent reference to a calibration measurement, and automatically send directions to the operator feedback device output to provide indicia of the tympanic probe distance between the sound receiving end of the probe tube and a tympanic membrane.

Item 18: A probe insertion apparatus for real ear measurement, the apparatus comprising:

a probe tube having a sound receiving end positionable in an ear canal, and a sound output end sonically coupled to a measurement microphone;

a reference microphone positionable outside the ear canal;

a reference speaker positionable to emit reference sound towards the ear canal;

an operator feedback device;

a memory storing computer readable instructions; and a processor configured to execute the computer readable instructions, wherein the computer readable instructions when executed configure the processor to:

direct the reference speaker to continuously emit the reference sound, and automatically perform several iterations of:

receiving reference signals from the reference microphone, and tympanic reflection signals from the measurement microphone, determining, one or many times, a tympanic distance between the sound receiving end of the probe tube and a tympanic membrane based on the reference signals and the tympanic reflection signals and absent reference to a calibration measurement, and directing the operator feedback device to provide an indicium of the tympanic distance between the sound receiving end of the probe tube and the tympanic membrane.

Item 19: A method of performing a real ear measurement, the method comprising:

a) emitting reference sound towards the ear canal, b) moving a sound receiving end of a probe tube in an ear canal towards a tympanic membrane, c) receiving tympanic reflection signals from a measurement microphone acoustically coupled to the probe tube, d) receiving reference signals from a reference microphone located outside the ear canal, e) continuously determining a tympanic distance between the sound receiving end of the probe tube and the tympanic membrane based on the reflection signals and the reference signals and absent reference to a calibration measurement, and f) continuously providing indicia of the determined tympanic distance between the sound receiving end of the probe tube and the tympanic membrane, wherein a) to f) are performed concurrently.

Item 20: The method of any preceding item, wherein said providing indicia comprises providing visual indicia of the determined tympanic distance.

Item 21: The method of any preceding item, wherein:

the visual indicia comprise a graphical representation of an ear canal and an indicator positioned with respect to the graphical representation to indicate determined tympanic distance.

Item 22: The method of any preceding item, wherein:

the indicia comprise one or more of auditory and haptic indicia.

Item 23: The method of any preceding item wherein:

said providing indicia comprises emitting auditory indicia of the tympanic distance.

Item 24: A probe insertion apparatus for real ear measurement, the apparatus comprising:

a probe tube having a sound receiving end positionable in an ear canal, and a sound output end sonically coupled to a measurement microphone;

a reference microphone positionable outside the ear canal;

a reference speaker positionable to emit reference sound towards the ear canal; an operator feedback device;

a memory storing computer readable instructions and a neural network model; and a processor configured to execute the computer readable instructions, wherein the computer readable instructions when executed configure the processor to:

direct the reference speaker to continuously emit the reference sound, and automatically perform several iterations of:

receiving reference signals from the reference microphone, and tympanic reflection signals from the measurement microphone, determining, one or many times, a tympanic distance between the sound receiving end of the probe tube and a tympanic membrane by supplying the neural network model with inputs based on the received reference and tympanic reflection signals, and receiving from the neural network model output corresponding to a determined tympanic distance, and directing the operator feedback device to provide an indicium of the tympanic distance between the sound receiving end of the probe tube and the tympanic membrane.

The invention claimed is:

1. A probe insertion apparatus for real ear measurement, the apparatus comprising:

a flexible hollow tube having a sound receiving end operationally positioned in an ear canal, and a sound output end operationally positioned outside the ear canal and sonically coupled to a measurement microphone located outside the ear canal;

a reference microphone operationally positioned outside the ear canal;

a reference speaker operationally positioned outside the ear canal to emit reference sound towards the ear canal;

an operator feedback device comprising at least one of a display, speaker, vibrator, and an arrangement of light sources;

a memory storing computer readable instructions; and a processor configured to execute the computer readable instructions, wherein the computer readable instructions when executed configure the processor to:

direct the reference speaker to continually emit the reference sound, without pause and without interruption, during a probing duration during which the sound receiving end of the flexible hollow tube is moved within the ear canal from an initial position to a final position for obtaining the real ear measurement, and during the probing duration, continually receive, without pause and without interruption, reference signals from the reference microphone and tympanic reflection signals from the measurement microphone, repeatedly calculate a tympanic distance between the sound receiving end of the flexible hollow tube and a tympanic membrane based on the reference signals and the tympanic reflection signals, without referencing any calibration measurement, as the operator moves the sound receiving end towards the tympanic membrane, wherein each repetition of calculating the tympanic distance occurs without regard to movement of the sound receiving end and without regard to positioning of the sound receiving end within the ear canal, and automatically direct the operator feedback device to provide indicia of the repeatedly calculated tympanic distance between the sound receiving end of the flexible hollow tube and a tympanic membrane, as the operator moves the sound receiving end towards the tympanic membrane between the initial and final positions, said indicia comprising at least one of visual indicia, auditory indicia, and haptic indicia.

2. The probe insertion apparatus of claim 1, wherein: each calculation of the tympanic distance is based solely on the reference and tympanic reflections signals.

3. The probe insertion apparatus of claim 1, wherein: each calculation of the tympanic distance is based on current reference and tympanic reflection signals as well as reference and tympanic reflection signals used to determine a previous tympanic distance.

4. The probe insertion apparatus of claim 1, wherein: the memory stores a neural network model, and said repeatedly calculating the tympanic distance comprises
continuously supplying the neural network model with inputs based on the received reference and tympanic reflection signals, and
continuously receiving from the neural network model outputs corresponding to the repeatedly calculated tympanic distances.

5. The probe insertion apparatus of claim 4, wherein: the neural network model is a recurrent neural network model.

6. The probe insertion apparatus of claim 1, wherein: the indicia comprise visual indicia.

7. The probe insertion apparatus of claim 6, wherein: the operator feedback device comprises a display that provides the visual indicia.

8. The probe insertion apparatus of claim 7, wherein: the visual indicia identify the determined tympanic distance.

9. The probe insertion apparatus of claim 7, wherein: the display presents a graphical representation of an ear canal and an indicator positioned with respect to the graphical representation to indicate the tympanic distance.

10. The probe insertion apparatus of claim 1, wherein: the indicia comprise one or more of auditory and haptic indicia.

11. The probe insertion apparatus of claim 10, wherein: the operator feedback device comprises a notification speaker that emits auditory indicia, and
the notification speaker and reference speaker emit sound in different directions.

12. The probe insertion apparatus of claim 10, wherein: the operator feedback device comprises the reference speaker, that when activated outputs the auditory indicia composed of feedback sound frequencies lower than the reference sound.

13. The probe insertion apparatus of claim 1, wherein the computer readable instructions when executed further configure the processor to:
detect a blockage of the flexible hollow tube in the ear canal based on a volume characteristic of the tympanic reflection signals.

14. The probe insertion apparatus of claim 13, wherein the computer readable instructions when executed further configure the processor to:
automatically direct the operator feedback device to provide an indicium of the blockage in response to detecting the blockage.

15. The probe insertion apparatus of claim 1, wherein the computer readable instructions when executed further configure the processor to:
detect a blockage of the flexible hollow tube in the ear canal based on a volume characteristic of the tympanic reflection signals being indicative of (a) a reflection volume below a threshold volume and (b) the reflection volume being less than a reference volume by a threshold volume difference.

16. The probe insertion apparatus of claim 15, wherein: the volume characteristic, the reflection volume, and the reference volume only relate to sound frequencies of 500 Hz or less.

17. A probe insertion apparatus for real ear measurement, the apparatus comprising:
a memory storing computer readable instructions; and
a processor configured to execute the computer readable instructions, wherein the computer readable instructions when executed cause the processor to:
control a reference speaker positioned outside an ear canal to continually emit a reference sound towards the ear canal, without pause and without interruption, during a probing duration during which the sound receiving end of the flexible hollow tube is moved within the ear canal from an initial position to a final position for obtaining the real ear measurement, and
during the probing duration,
continually receive, without pause and without interruption,
reference signals inputted via a reference microphone positioned outside the ear canal, and
tympanic reflection signals inputted via a measurement microphone located outside the ear canal and sonically coupled to one end of a flexible hollow tube positioned outside the ear canal, another sound receiving end of the flexible hollow tube being positioned in the ear canal and movable by an operator toward a tympanic membrane,
repeatedly calculate a tympanic probe distance based on the reference signals and the tympanic reflection signals, without referencing any calibration measurement, wherein each repetition of calculating the tympanic distance occurs without regard to movement of the sound receiving end and without regard to positioning of the sound receiving end within the ear canal, and
automatically control an operator feedback device to output indicia providing real-time feedback to the operator, while the sound receiving end is being moved between the initial and final positions, of the repeatedly calculated tympanic probe distance between the sound receiving end of the flexible hollow tube and the tympanic membrane so as to alert the operator when the tympanic probe distance is at a target distance for measuring a sound pressure level in the ear canal, wherein the operator feedback de vice comprises at least one of a display, speaker, vibrator, and an arrangement of light sources, and wherein the indicia comprises at least one of visual indicia, auditory indicia, and haptic indicia.

18. A probe insertion apparatus for real ear measurement, the apparatus comprising:
   a flexible hollow tube having a sound receiving end operationally positioned in an ear canal, and a sound output end operationally positioned outside the ear canal and sonically coupled to a measurement microphone located outside the ear canal;
   a reference microphone operationally positioned outside the ear canal;
   a reference speaker operationally positioned outside the ear canal to emit reference sound towards the ear canal;
   an operator feedback device comprising at least one of a display, speaker, vibrator, and an arrangement of light sources;
   a memory storing computer readable instructions and a neural network model; and
   a processor configured to execute the computer readable instructions, wherein the computer readable instructions when executed configure the processor to:
      direct the reference speaker to continually emit the reference sound, without pause and without interruption, during a probing duration during which the sound receiving end of the flexible hollow tube is moved within the ear canal from an initial position to a final position for obtaining the real ear measurement, and
   during the probing duration,
      continually receive, without pause and without interruption, reference signals from the reference microphone and tympanic reflection signals from the measurement microphone,
      repeatedly determine a tympanic distance between the sound receiving end of the flexible hollow tube and a tympanic membrane by supplying the neural network model with inputs based on the received reference and tympanic reflection signals, and receiving from the neural network model output corresponding to a determined tympanic distance, wherein each repetition of determining the tympanic distance occurs without regard to movement of the sound receiving end and without regard to positioning of the sound receiving end within the ear canal, and
      directing the operator feedback device to provide at least an auditory indicium of the tympanic distance between the sound receiving end of the flexible hollow tube and the tympanic membrane, said auditory indicium being of a non-overlapping frequency range relative to the continually emitted reference sound,
   wherein the frequency range of the auditory indicium is filtered out from the reference and tympanic reflection signals prior to the reference and tympanic reflection signals being supplied to the neural network.

19. The probe insertion apparatus of claim 18, wherein: the neural network model is a recurrent neural network model.

* * * * *